US012561916B2

(12) United States Patent
Fujino

(10) Patent No.: US 12,561,916 B2
(45) Date of Patent: Feb. 24, 2026

(54) INFORMATION PROCESSING APPARATUS

(71) Applicant: NTT DOCOMO, INC., Tokyo (JP)

(72) Inventor: Hiroyuki Fujino, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 129 days.

(21) Appl. No.: 18/712,020

(22) PCT Filed: Nov. 24, 2022

(86) PCT No.: PCT/JP2022/043372
§ 371 (c)(1),
(2) Date: May 21, 2024

(87) PCT Pub. No.: WO2023/095833
PCT Pub. Date: Jun. 1, 2023

(65) Prior Publication Data
US 2025/0022230 A1      Jan. 16, 2025

(30) Foreign Application Priority Data

Nov. 25, 2021    (JP) ................................. 2021-191054

(51) Int. Cl.
*G06T 19/00*              (2011.01)
(52) U.S. Cl.
CPC ........ *G06T 19/00* (2013.01); *G06T 2219/024* (2013.01)
(58) Field of Classification Search
None
See application file for complete search history.

(56) References Cited

U.S. PATENT DOCUMENTS

2010/0079467 A1* 4/2010 Boss ....................... A63F 13/30
                                                                                        345/474
2022/0335700 A1* 10/2022 Watanabe ........... G06F 3/04886

FOREIGN PATENT DOCUMENTS

JP              2014-6881 A        1/2014
JP              2021111239 A   *  8/2021

OTHER PUBLICATIONS

International Search Report mailed on Feb. 14, 2023 in PCT/JP2022/043372 filed on Nov. 24, 2022, 4 pages (with English translation).

* cited by examiner

*Primary Examiner* — Tapas Mazumder
(74) *Attorney, Agent, or Firm* — Oblon, McClelland, Maier & Neustadt, L.L.P.

(57) ABSTRACT

An information processing apparatus includes: an acquirer configured to acquire state information regarding a state of an avatar in a virtual space, the avatar corresponding to a first user; and a display controller configured to: cause a display used by a second user to display a first character as the avatar based on the state information satisfying a first condition regarding the state; and cause the display to display a second character as the avatar based on the state information satisfying a second condition regarding the state without satisfying the first condition, the second character being determined based on a relationship between the first user and the second user.

13 Claims, 9 Drawing Sheets

FIG. 1
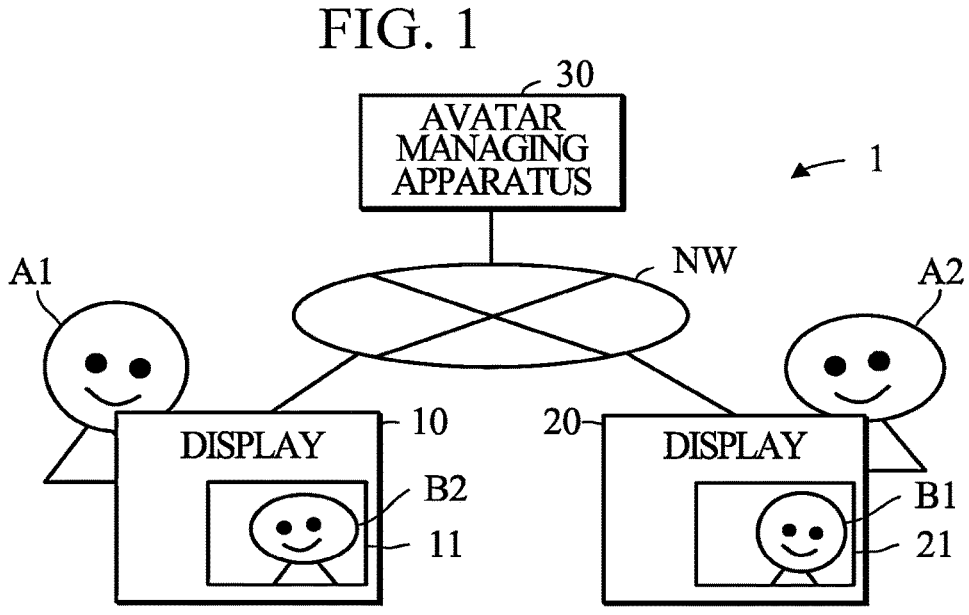
FIG. 2
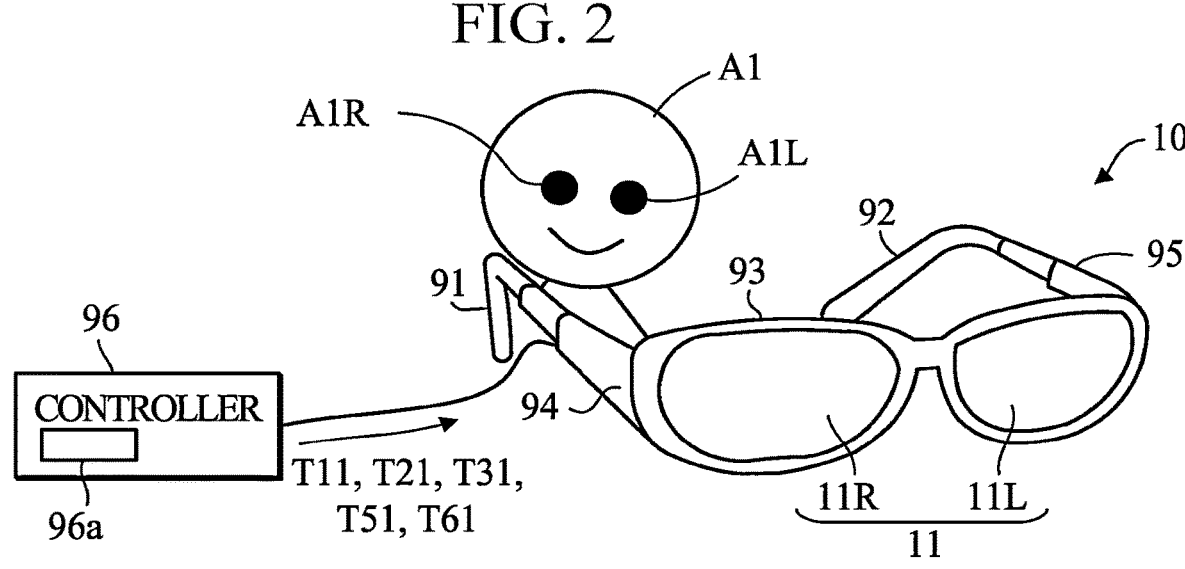
FIG. 3
| USER ID | REAL AVATAR ID (CHARACTER ID) | NON-REAL AVATAR ID (CHARACTER ID) | FRIEND (USER ID) |
|---|---|---|---|
| USER A1a | CHARACTER B11 | CHARACTER B12 | USER A2a |

| CHARACTER ID | CHARACTER |
|---|---|
| CHARACTER B11 | B11a |
| CHARACTER B12 | B12a |

| USER ID | AREA | RELATIONSHIP | REAL AVATAR | NON-REAL AVATAR |
|---|---|---|---|---|
| USER A1a | SCHOOL | ––– | ◯ | |
| | NOT SCHOOL | FRIENDSHIP | ◯ | |
| | | NOT FRIENDSHIP | | ◯ |

| USER ID | AVATAR LOCATION INFORMATION |
|---------|------------------------------|
| USER A1a | (x1, y1, z1) |

T41

| USER ID | REAL AVATAR ID (CHARACTER ID) | NON-REAL AVATAR ID (CHARACTER ID) | FRIEND (USER ID) |
|---------|-------------------------------|-----------------------------------|------------------|
| USER A2a | CHARACTER B21 | CHARACTER B22 | USER A1a |

| CHARACTER ID | CHARACTER |
|---|---|
| CHARACTER B21 | B21a |
| CHARACTER B22 | B22a |

| USER ID | AREA | RELATIONSHIP | REAL AVATAR | NON-REAL AVATAR |
|---|---|---|---|---|
| USER A2a | COSTUME PARTY VENUE | ——— | | ○ |
| | NOT COSTUME PARTY VENUE | FRIENDSHIP | ○ | |
| | | NOT FRIENDSHIP | | ○ |

| USER ID | AVATAR LOCATION INFORMATION |
|---|---|
| USER A2a | (x2, y2, z2) |

T1

| USER ID | REAL AVATAR ID (CHARACTER ID) | NON-REAL AVATAR ID (CHARACTER ID) | FRIEND (USER ID) | |
|---|---|---|---|---|
| USER A1a | CHARACTER B11 | CHARACTER B12 | USER A2a | ← T11 |
| USER A2a | CHARACTER B21 | CHARACTER B22 | USER A1a | ← T12 |

FIG. 15

| USER ID | AREA | RELATIONSHIP | REAL AVATAR | NON-REAL AVATAR | |
|---|---|---|---|---|---|
| USER A1a | SCHOOL | ---- | ○ | | T31 |
| | NOT SCHOOL | FRIENDSHIP | ○ | | |
| | | NOT FRIENDSHIP | | ○ | |
| USER A2a | COSTUME PARTY VENUE | ---- | | ○ | T32 |
| | NOT COSTUME PARTY VENUE | FRIENDSHIP | ○ | | |
| | | NOT FRIENDSHIP | | ○ | |

| USER ID | AVATAR LOCATION INFORMATION | |
|---|---|---|
| USER A1a | (x1, y1, z1) | ← T41 |
| USER A2a | (x2, y2, z2) | ← T42 |

T4

START

ACQUIRE AVATAR-RELATED INFORMATION T4 — S201

IS AVATAR B2 IN COSTUME PARTY VENUE? — S202

YES

NO

FRIENDSHIP? — S204

NO

YES — S205

DISPLAY REAL AVATAR

DISPLAY NON-REAL AVATAR — S203

END

B21a(B2)

11

B22a(B2)

11

INFORMATION PROCESSING APPARATUS

TECHNICAL FIELD

The present invention relates to information processing apparatuses.

BACKGROUND ART

Patent Document 1 describes an apparatus that is configured to cause a terminal device used by a first user to display an avatar of a second user. This apparatus is configured to cause the terminal device to display the avatar of the second user in a display mode based on a relationship between the first user and the second user.

RELATED ART DOCUMENT

Patent Document

Patent Document 1: Japanese Patent Application Laid-Open Publication No. 2014-6881

SUMMARY OF THE INVENTION

Problem to be Solved by the Invention

There is a need to control the display of an avatar by a method different from the method described in Patent Document 1. For example, there is a need to use a specific character as an avatar regardless of a relationship between users when a predetermined condition is satisfied.

An object of the present invention is to provide an information processing apparatus that can meet the need to use a specific character as an avatar regardless of a relationship between users when a predetermined condition is satisfied.

Means for Solving Problem

An information processing apparatus according to one aspect includes: an acquirer configured to acquire state information regarding a state of an avatar in a virtual space, the avatar corresponding to a first user; and a display controller configured to: cause a display used by a second user to display a first character as the avatar based on the state information satisfying a first condition regarding the state; and cause the display to display a second character as the avatar based on the state information satisfying a second condition regarding the state without satisfying the first condition, the second character being determined based on a relationship between the first user and the second user.

Effect of Invention

According to one aspect, it is possible to meet a need to use a specific character as an avatar regardless of a relationship between users when a predetermined condition is satisfied.

BRIEF DESCRIPTION OF THE DRAWINGS

FIG. 1 is a schematic diagram showing a display control system 1.
FIG. 2 is a diagram showing an example of an appearance of a display 10.

FIG. 3 is a diagram showing an example of user information T11.
FIG. 4 is a diagram showing an example of avatar information T21.
FIG. 5 is a diagram showing an example of display control information T31.
FIG. 9 is a diagram showing an example of avatar information T22.
FIG. 10 is a diagram showing an example of display control information T32.
FIG. 11 is a diagram showing an example of avatar-related information T42.
FIG. 15 is a diagram showing an example of display control information T3.
FIG. 16 is a diagram showing an example of avatar-related information T4.
FIG. 17 is a diagram explaining an example of an operation of the avatar managing apparatus 30 based on the display control information T31 for a user A1.
FIG. 18 is a diagram showing an example of displaying a character B11a.
FIG. 19 is a diagram showing an example of displaying a character B12a.
FIG. 20 is a diagram explaining an example of an operation of the avatar managing apparatus 30 based on the display control information T32 for the user A2.
FIG. 21 is a diagram showing an example of displaying a character B21a.
FIG. 22 is a diagram showing an example of displaying a character B22a.

MODES FOR CARRYING OUT THE INVENTION

A: First Embodiment

A1: Display Control System 1

Figures 6, 7, 8:
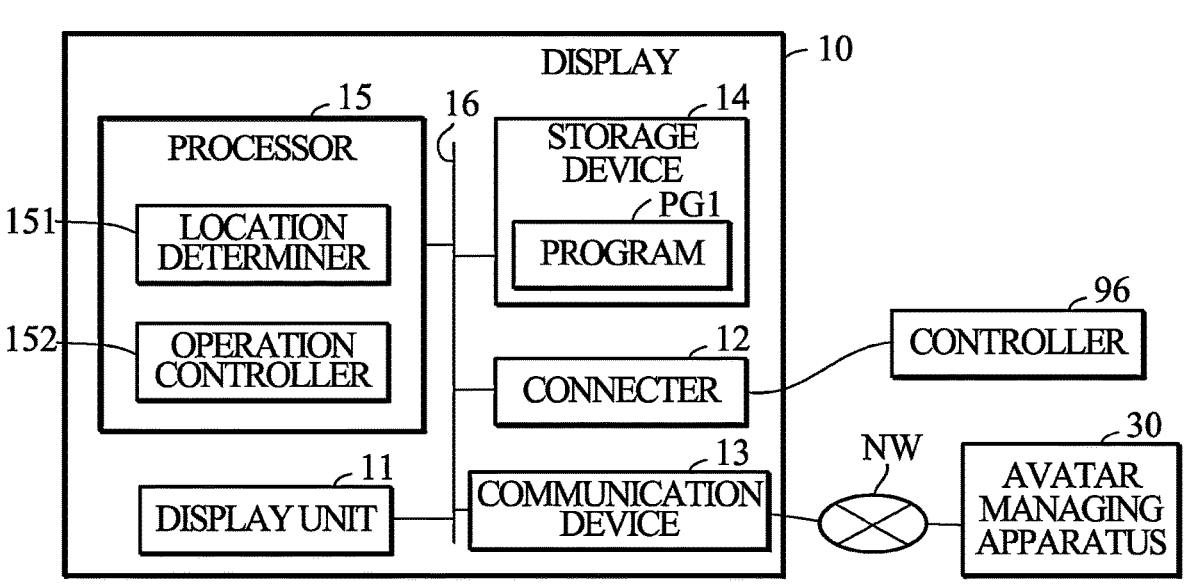
FIG. 6 is a diagram showing an example of a configuration of the display 10.
FIG. 7 is a diagram showing an example of avatar-related information T41.
FIG. 8 is a diagram showing an example of user information T12.

FIG. 1 is a schematic diagram showing a display control system 1. The display control system 1 includes a plurality of displays and an avatar managing apparatus 30. The plurality of displays includes displays 10 and 20. The plurality of displays may further include a display that is different from each of the displays 10 and 20.

The displays 10 and 20 are each, for example, smart glasses. The smart glasses are referred to as an eyeglasses type display. The smart glasses are, for example, virtual reality (VR) glasses or augmented reality (AR) glasses. The smart glasses are referred to as X reality (XR) glasses or as a head mounted display (HMD). At least one of the displays 10 and 20 is not limited to smart glasses, and may be a display that is not of an eyeglasses type, for example. The at least one of the displays 10 and 20 means "a display 10," "a display 20," or "the displays 10 and 20," for example. The display that is not of an eyeglasses type is, for example, a smartphone, a tablet, a personal computer, or a game device.

The display 10 is used by a user A1. The user A1 is an example of a first user. The user A1 may be an example of a second user, but not the example of the first user. The display 10 communicates with the avatar managing apparatus 30 via communication lines NW. The display 10 may communicate with the avatar managing apparatus 30 via a communication device such as a smart phone and via the communication lines NW. The display 10 may communicate with the avatar managing apparatus 30 not via the communication lines NW. The display 10 includes a display unit 11.

The display 20 is used by a user A2. The user A2 is an example of the second user when the user A1 is an example of the first user. The user A2 is an example of the first user when the user A1 is an example of the second user. The display 20 communicates with the avatar managing apparatus 30 via the communication lines NW. The display 20 may communicate with the avatar managing apparatus 30 via a communication device such as a smart phone and via the communication lines NW. The display 20 may communicate with the avatar managing apparatus 30 not via the communication lines NW. The display 20 includes a display unit 21.

The avatar managing apparatus 30 is configured to manage an avatar B1, an avatar B2, and a virtual space. The avatar B1 is an avatar corresponding to the user A1. The avatar B1 is used as a representation of the user A1. The avatar B2 is an avatar corresponding to the user A2. The avatar B2 is used as a representation of the user A2. The avatar managing apparatus 30 places the avatar B1 and the avatar B2 in the virtual space.

The virtual space is a virtual three-dimensional space generated by the avatar managing apparatus 30. The virtual space is not limited to the virtual three-dimensional space, and it may be a virtual two-dimensional space. The virtual space includes, for example, an area in which a school is placed, an area in which a costume party venue is placed, and an area in which neither the school nor the costume party venue is placed. The area in which neither the school nor the costume party venue is placed includes, for example, an area in which an open space is placed and an area in which a store is placed. To the virtual space, a coordinate system is applied for determining locations in the virtual space. The locations in the virtual space are each defined by coordinates based on the coordinate system.

The avatar managing apparatus 30 is configured to cause the display 20 used by the user A2 to display the avatar B1 corresponding to the user A1. The avatar managing apparatus 30 is configured to cause the display 10 used by the user A1 to display the avatar B2 corresponding to the user A2. The avatar managing apparatus 30 may cause each of the displays 10 and 20 to display the avatar B1 and the avatar B2.

A2: Display 10

FIG. 2 is a diagram showing an example of an appearance of the display 10. The display 10 shown in FIG. 2 is an eyeglasses-type display such as smart glasses. The display 10 includes temples 91 and 92, a bridge 93, bodies 94 and 95, and the display unit 11. The display unit 11 includes a left-eye display unit 11L and a right-eye display unit 11R.

When the display 10 is worn on the user A1, the left-eye display unit 11L is positioned in front of a left eye A1L of the user A1, and the right-eye display unit 11R is positioned in front of a right eye A1R of the user A1. The left-eye display unit 11L and the right-eye display unit 11R each display the avatar B2, for example.

The display 10 is connected to a controller 96 either by wire or wirelessly. The controller 96 may be a dedicated controller or may be a general-purpose device such as a smartphone. The controller 96 includes an operating unit 96a that is to be operated by the user A1. The operating unit 96a includes a plurality of operation buttons or a touch panel. The operating unit 96a may include both the plurality of operation buttons and the touch panel. The controller 96 receives various operations performed by the user A1 via the operating unit 96a.

For example, the controller 96 receives a registration operation from the user A1. The registration operation is an operation for registering information for controlling the avatar B1. When the controller 96 receives the registration operation, the controller 96 generates first registration information that is the information for controlling the avatar B1. The first registration information includes user information T11, avatar information T21, and display control information T31.

FIG. 3 is a diagram showing an example of the user information T11. The user information T11 is information about the user A1. The user information T11 indicates a user A1a, a character B11, a character B12, and a user A2a. In the user information T11, the user A1a, the character B11, the character B12, and the user A2a are associated with one another.

The user A1a is a user identifier (ID) that identifies the user A1. The user ID that identifies the user A1 is not limited to the user A1a, and may be a U-A1, for example.

The character B11 is a real avatar ID that identifies a real avatar of the user A1. The real avatar of the user A1 is an avatar that represents an appearance of the user A1. For example, the real avatar of the user A1 is a three-dimensional (3D) model avatar that represents the appearance of the user A1. The real avatar of the user A1 is not limited to the 3D model avatar that represents the appearance of the user A1, and may be a two-dimensional (2D) model avatar that represents the appearance of the user A1. The real avatar ID that identifies the real avatar of the user A1 is not limited to the character B11, and may be a C-B11, for example. The character B11 is further a character ID that identifies a character.

The character B12 is a non-real avatar ID that identifies a non-real avatar of the user A1. The non-real avatar of the user A1 is an avatar that differs from the real avatar of the user A1. The non-real avatar ID that identifies the non-real avatar of the user A1 is not limited to the character B12, and may be a C-B12, for example. The character B12 is further a character ID.

The user A2a is a user ID that identifies the user A2 that is a friend of the user A1. The user ID that identifies the user A2 is not limited to the user A2a, and may be a U-A2, for example.

Here, a way to use the real avatar of the user A1 and a way to use the non-real avatar of the user A1 are described briefly. The real avatar of the user A1 is the avatar that represents the appearance of the user A1. Thus, the real avatar of the user A1 may correspond to personal data of the user A1. To protect the real avatar of the user A1 (personal data of the user A1), the display control system 1 automatically switches the real avatar of the user A1 and the non-real avatar of the user A1. The real avatar of the user A1 and the non-real avatar of the user A1 are each an example of the avatar B1 corresponding to the user A1.

FIG. 4 is a diagram showing an example of the avatar information T21. The avatar information T21 is information that indicates an example of the real avatar of the user A1 and an example of the non-real avatar of the user A1. The avatar information T21 indicates a character B11*a*, which is associated with the character B11 that is a character ID, and a character B12*a*, which is associated with the character B12 that is a character ID. The character B11*a* is an example of the real avatar of the user A1. When the user A1 is an example of the first user, the character B11*a* is an example of a first character. An appearance the character B11*a* is not limited to an appearance shown in FIG. 4, and it may be changed as appropriate. The character B12*a* is an example of the non-real avatar of the user A1. When the user A1 is an example of the first user, the character B12*a* is an example of a third character. An appearance of the character B12*a* is not limited to an appearance shown in FIG. 4, and it may be changed as appropriate. A degree of agreement between the appearance of the character B11*a* and the appearance of the user A1 is greater than a degree of agreement between the appearance of the character B12*a* and the appearance of the user A1.

FIG. 5 is a diagram showing an example of the display control information T31. The display control information T31 is information for controlling the avatar B1 corresponding to the user A1.

The display control information T31 indicates that, when the avatar B1 is placed in the school in the virtual space, the real avatar of the user A1 (for example, the character B11*a*) is displayed as the avatar B1.

The display control information T31 indicates that, when the avatar B1 is placed in an area other than the school in the virtual space (for example, the open space in the virtual space), the real avatar of the user A1 is displayed as the avatar B1 to a user who is a friend of the user A1.

The display control information T31 indicates that, when the avatar B1 is placed in the area other than the school in the virtual space, the non-real avatar of the user A1 (for example, the character B12*a*) is displayed as the avatar B1 to a user who is not a friend of the user A1.

The display control information T31 is not limited to the information shown in FIG. 5, and may be changed as appropriate. For example, instead of the "school," a "workplace" or a "wedding hall" may be indicated by the display control information T31.

The controller 96 shown in FIG. 2 provides the display 10 with the first registration information that includes the user information T11, the avatar information T21, and the display control information T31.

The controller 96 receives an avatar placement operation in addition to the registration operation. The avatar placement operation is an operation for placing the avatar B1 in the virtual space. The avatar B1 is placed based on the avatar placement operation at a specific location in the virtual space. The specific location may be a predetermined location, or alternatively, the specific location may be a location selected by the user A1 from among a plurality of candidate locations.

When the controller 96 receives the avatar placement operation, the controller 96 generates avatar placement information T51. The avatar placement information T51 is information indicative of a location of the avatar B1 in the virtual space. The controller 96 provides the avatar placement information T51 to the display 10.

The controller 96 receives an avatar location change operation in addition to the registration operation and avatar placement operation. The avatar location change operation is an operation for changing the location of the avatar B1 in the virtual space. When the controller 96 receives the avatar location change operation, the controller 96 generates location change information T61. The location change information T61 is information indicative of a change in the location of the avatar B1 in the virtual space. For example, the location change information T61 indicates a movement distance dependent on the avatar location change operation and a movement direction dependent on the avatar location change operation. The controller 96 provides the location change information T61 to the display 10.

FIG. 6 is a diagram showing an example of a configuration of the display 10. The display 10 includes connector 12, a communication device 13, a storage device 14, a processor 15, and a bus 16, in addition to the display unit 11. The display unit 11, the connector 12, the communication device 13, the storage device 14, and the processor 15 are interconnected by the bus 16 for communicating information. The bus 16 may be constituted of a single bus or may be constituted of different buses that are each provided between devices.

The connector 12 is connected to the controller 96 either by wire or wirelessly. The connector 12 receives the first registration information (the user information T11, the avatar information T21, and the display control information T31), the avatar placement information T51, and the location change information T61 from the controller 96.

The communication device 13 communicates with the avatar managing apparatus 30 via the communication lines NW. The communication device 13 may communicate with the avatar managing apparatus 30 via a communication device such as a smart phone and via the communication lines NW. The communication device 13 may communicate with the avatar managing apparatus 30 not via the communication lines NW.

The storage device 14 is a recording medium readable by the processor 15. The storage device 14 includes, for example, a non-volatile memory and a volatile memory. The non-volatile memory is, for example, a read only memory (ROM), an erasable programmable read only memory (EPROM), and an electrically erasable programmable read only memory (EEPROM). The volatile memory is, for example, a random access memory (RAM). The storage device 14 stores a program PG1.

The processor 15 includes one or more central processing units (CPUs). The one or more CPUs are examples of one or more processors. The processor and the CPU are each an example of a computer.

The processor 15 reads the program PG1 from the storage device 14. The processor 15 executes the program PG1 to function as a location determiner 151 and an operation controller 152. At least one of the location determiner 151 and the operation controller 152 may be constituted of circuitry such as a digital signal processor (DSP), an application specific integrated circuit (ASIC), and a field programmable gate array (FPGA). The at least one of the location determiner 151 and the operation controller 152 means "the location determiner 151," "the operation controller 152," or "the location determiner 151 and the operation controller 152," for example.

The location determiner 151 is configured to determine a current location of the avatar B1 in the virtual space. For example, in response to acquiring the avatar placement information T51 from the controller 96 via the connector 12, the location determiner 151 determines the location indicated by the avatar placement information T51 as the current location of the avatar B1 in the virtual space. In response to acquiring the location change information T61 from the controller 96 via the connector 12 after the current location of the avatar B1 in the virtual space is determined, the 10) location determiner 151 updates the current location of the avatar B1 in the virtual space based on the location change information T61. For example, the location determiner 151 first confirms the movement direction indicated by the location change information and the movement distance indicated by the location change information. Subsequently, the location determiner 151 changes the current location of the avatar B1 in the virtual space to a location that is apart from the current location in the movement direction by the movement distance. Thereafter, each time the location determiner 151 acquires location change information T61, the location determiner 151 updates the current location of the avatar B1 in the virtual space as described above. The location determiner 151 generates avatar location information 20 indicative the latest current location of the avatar B1 in the virtual space. The avatar location information indicates three-dimensional coordinates (x1, y1, z1) as the latest current location of the avatar B1 in the virtual space, for example.

The operation controller 152 in configured to control an operation of the display 10. For example, the operation controller 152 acquires the avatar location information from the location determiner 151. The operation controller 152 generates avatar-related information T41 that includes the avatar location information.

FIG. 7 is a diagram showing an example of the avatar-related information T41. The avatar-related information T41 indicates the user A1a, which is a user ID, and the three-dimensional coordinates (x1, y1, z1), which constitute the avatar location information.

The operation controller 152 shown in FIG. 6 acquires the first registration information (the user information T11, the avatar information T21, and the display control information T31) from the controller 96 via the connector 12. The operation controller 152 transmits the first registration information and the avatar-related information T41 from the communication device 13 to the avatar managing apparatus 30 at the same time or separately. The operation controller 152 displays the avatar B2 on the display unit 11 based on control from the avatar managing apparatus 30.

The location determiner 151, the operation controller 152, and the communication device 13 may be included in the controller 96 instead of in the display 10. In this case, the controller 96 transmits the first registration information and the avatar-related information T41 from the communication device 13 to the avatar managing apparatus 30 at the same time or separately.

A3: Display 20

The display 20 includes elements that have the same configuration as the elements included in the display 10. Thus, detailed description of the display 20 is omitted.

The display 20 transmits second registration information and avatar-related information T42 to the avatar managing apparatus 30 at the same time or separately. Instead of the display 20, a controller that is connected to the display 20 may transmit the second registration information and the avatar-related information T42 to the avatar managing apparatus 30 at the same time or separately. The second registration information is information for controlling the avatar B2. The second registration information includes user information T12, avatar information T22, and display control information T32.

FIG. 8 is a diagram showing an example of the user information T12. The user information T12 is information about the user A2. The user information T12 indicates the user A2a, a character B21, a character B12, and the user A1a.

The user A2a indicated by the user information T12 is a user ID that identifies the user A2. The character B21 is a real avatar ID that identifies a real avatar of the user A2. The real avatar of the user A2 is an avatar that represents an appearance of the user A2. The real avatar ID that identifies the real avatar of the user A2 is not limited to the character B21, and may be a C-B21, for example. The character B21 is further a character ID that identifies a character.

The character B22 is a non-real avatar ID that identifies a non-real avatar of the user A2. The non-real avatar of the user A2 is an avatar that differs from the real avatar of the user A2. The non-real avatar ID that identifies the non-real avatar of the user A2 is not limited to the character B22, and may be a C-B22, for example. The character B22 is further a character ID.

The user A1a indicated by the user information T12 is a user ID that identifies the user A1 that is a friend of the user A2.

The real avatar of the user A2 and the non-real avatar of the user A2 are each an example of the avatar B2 corresponding to the user A2.

FIG. 9 is a diagram showing an example of the avatar information T22. The avatar information T22 is information that indicates an example of the real avatar of the user A2 and an example of the non-real avatar of the user A2. The avatar information T22 indicates a character B21a, which is associated with the character B21 that is a character ID, and a character B22a, which is associated with the character B22 is a character ID. The character B21a is an example of the real avatar of the user A2. An appearance of the character B21a is not limited to an appearance shown in FIG. 9, and it may be changed as appropriate. The character B22a is an example of the non-real avatar of the user A2. An appearance of the character B22a is not limited to an appearance shown in FIG. 9, and it may be changed as appropriate. A degree of agreement between the appearance of the character B21a and the appearance of the user A2 is greater than a degree of agreement between the appearance of the character B22a and the appearance of the user A2.

FIG. 10 is a diagram showing an example of the display control information T32. The display control information T32 is information for controlling the avatar B2 corresponding to the user A2.

The display control information T32 indicates that, when the avatar B2 is placed in the costume party venue in the virtual space, the non-real avatar of the user A2 (for example, the character B22a) is displayed as the avatar B2.

The display control information T32 indicates that, when the avatar B2 is placed in an area other than the costume party venue in the virtual space, the real avatar of the user A2 (for example, the character B21a) is displayed as the avatar B2 to a user who is a friend of the user A2. The area other than the costume party venue in the virtual space is, for example, the open space in the virtual space.

The display control information T32 indicates that, when the avatar B2 is placed in the area other than the costume party venue in the virtual space, the non-real avatar of the user A2 is displayed as the avatar B2 to a user who is not a friend of the user A2.

The display control information T32 is not limited to the information shown in FIG. 10, and may be changed as appropriate. For example, instead of the "costume party venue," a "store" may be indicated by the display control information T32.

FIG. 11 is a diagram showing an example of the avatar-related information T42. The avatar-related information T42 indicates the user A2a, which is a user ID, and avatar location information, which indicates a location of the avatar B2 in the virtual space. Three-dimensional coordinates (x2, y2, z2) shown in FIG. 11 constitute an example of the avatar location information indicative of the location of the avatar B2 in the virtual space.

A4: Avatar Managing Apparatus 30

Figure 12:
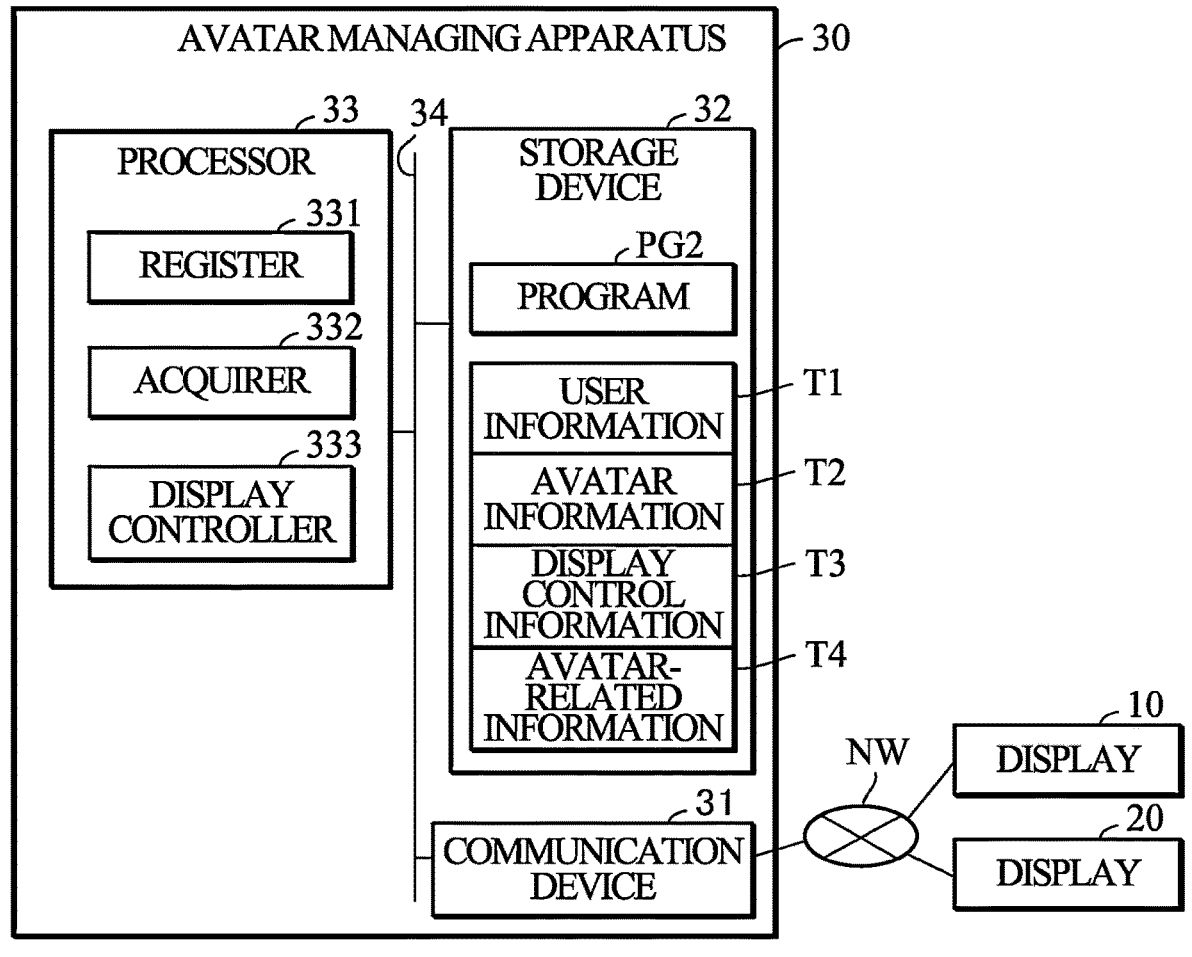
FIG. 12 is a diagram showing an example of an avatar managing apparatus 30.

FIG. 12 is a diagram showing an example of the avatar managing apparatus 30. The avatar managing apparatus 30 is, for example, a server. The avatar managing apparatus 30 is not limited to the server, and may be a workstation, for example. The avatar managing apparatus 30 is an example of an information processing apparatus.

The avatar managing apparatus 30 includes a communication device 31, a storage device 32, a processor 33, and a bus 34. The communication device 31, the storage device 32, and the processor 33 are interconnected by the bus 34 for communicating information. The bus 34 may be constituted of a single bus or may be constituted of different buses that are each provided between devices.

The communication device 31 communicates with each of the displays 10 and 20 via the communication lines NW. The communication device 31 may communicate with each of the displays 10 and 20 not via the communication lines NW.

The storage device 32 is a recording medium readable by the processor 33. The storage device 32 includes, for example, a non-volatile memory and a volatile memory. The storage device 32 stores a program PG2, user information T1, avatar information T2, display control information T3, and avatar-related information T4. The user information T1, the avatar information T2, the display control information T3, and the avatar-related information T4 are registered in the storage device 32 by a register 331 described below.

Figures 13, 14:
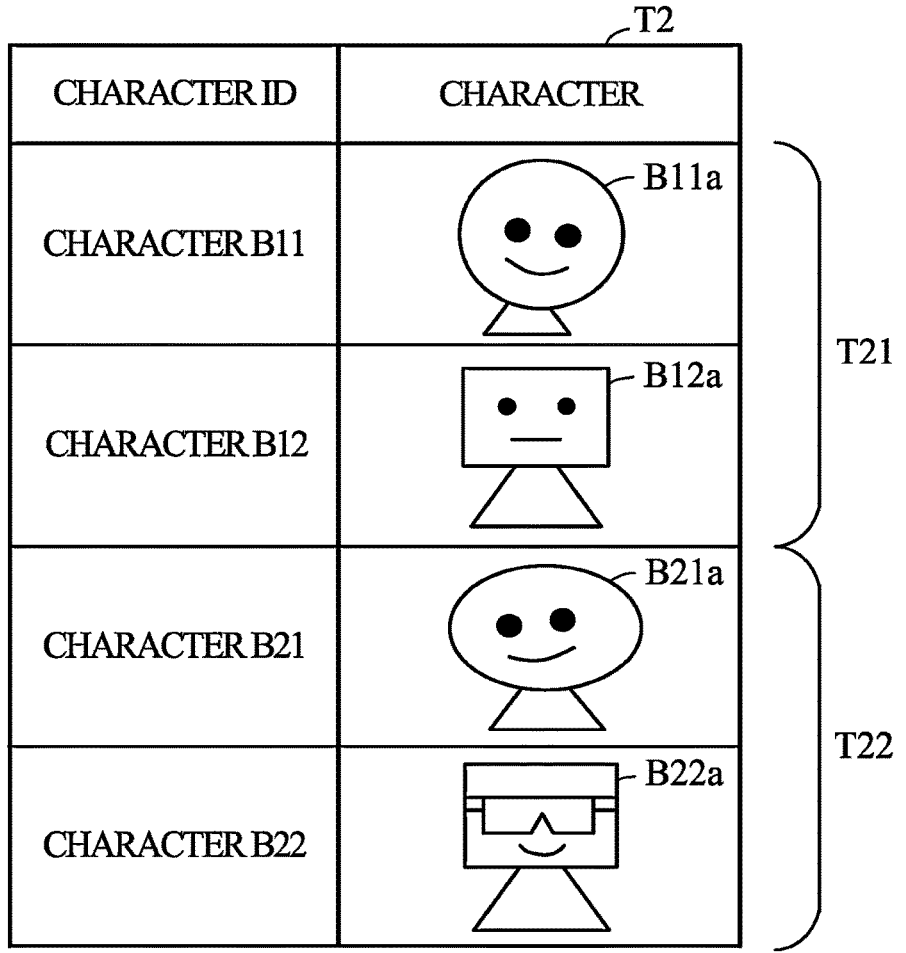
FIG. 13 is a diagram showing an example of user information T1.
FIG. 14 is a diagram showing an example of avatar information T2.

FIG. 13 is a diagram showing an example of the user information T1. The user information T1 is information that includes the user information T11 provided from the display 10 and the user information T12 provided from the display 20.

FIG. 14 is a diagram showing an example of the avatar information T2. The avatar information T2 is information that includes the avatar information T21 provided from the display 10 and the avatar information T22 provided from the display 20.

FIG. 15 is a diagram showing an example of the display control information T3. The display control information T3 is information that includes the display control information T31 provided from the display 10 and the display control information T32 provided from the display 20.

FIG. 16 is a diagram showing an example of the avatar-related information T4. The avatar-related information T4 is information that includes the avatar-related information T41 provided from the display 10 and the avatar-related information T42 provided from the display 20.

The processor 33 shown in FIG. 12 includes one or more CPUs. The processor 33 reads the program PG2 from the storage device 32. The processor 33 executes the program PG2 to function as the register 331, an acquirer 332, and a display controller 333. At least one of the register 331, the acquirer 332, and the display controller 333 may be constituted of circuitry such as a DSP, an ASIC, and an FPGA. The at least one of the register 331, the acquirer 332, and the display controller 333 means "the register 331," "the acquirer 332," "the display controller 333," "the register 331 and the acquirer 332," "the register 331 and the display controller 333," "the acquirer 332 and the display controller 333," or "the register 331, the acquirer 332, and the display controller 333."

The register 331 acquires the first registration information (the user information T11, the avatar information T21, and the display control information T31) and the avatar-related information T41 from the display 10 via the communication device 31. The register 331 acquires the second registration information (the user information T12, the avatar information T22, and the display control information T32) and the avatar-related information T42 from the display 20 via the communication device 31.

The register 331 registers the user information T11 in the storage device 32. The register 331 generates the user information T1 by adding the user information T12 to the user information T11 stored in the storage device 32. After registering the user information T12 in the storage device 32, the register 331 may generate the user information T1 by adding the user information T11 to the user information T12 stored in the storage device 32.

The register 331 registers the avatar information T21 in the storage device 32. The register 331 generates the avatar information T2 by adding the avatar information T22 to the avatar information T21 stored in the storage device 32. After registering the avatar information T22 in the storage device 32, the register 331 may generate the avatar information T2 by adding the avatar information T21 to the avatar information T22 stored in the storage device 32.

The register 331 registers the display control information T31 in the storage device 32. The register 331 generates the display control information T3 by adding the display control information T32 to the display control information T31 stored in the storage device 32. After registering the display control information T32 in the storage device 32, the register 331 may generate the display control information T3 by adding the display control information T31 to the display control information T32 stored in the storage device 32.

The register 331 registers the avatar-related information T41 in the storage device 32. The register 331 generates the avatar-related information T4 by adding the avatar-related information T42 to the avatar-related information T41 stored in the storage device 32. After registering the avatar-related information T42 in the storage device 32, the register 331 may generate the avatar-related information T4 by adding the avatar-related information T41 to the avatar-related information T42 stored in the storage device 32.

The acquirer 332 acquires the avatar-related information T4 from the storage device 32. The avatar-related information T4 includes the avatar location information indicative of the location of the avatar B1 in the virtual space, and the avatar location information indicative of the location of the avatar B2 in the virtual space. The avatar-related information T4 and the avatar location information indicative of the location of the avatar B1 in the virtual space are each an example of state information regarding a state of the avatar B1 in the virtual space. The avatar-related information T4 and the avatar location information indicative of the location of the avatar B2 in the virtual space are each an example of state information regarding a state of the avatar B2 in the virtual space.

The display controller 333 controls displaying of the avatar B1 on the display 20 and displaying of the avatar B2 on the display 10.

The display controller 333 causes the display 20 to display the character B11a as the avatar B1 based on the avatar-related information T4 satisfying a first display condition, the character B11a being shown in FIG. 14, the avatar-related information T4 being acquired by the acquirer 332. The character B11a is the real avatar of the user A1. The first display condition is, for example, a condition in that the avatar B1 be placed in the school in the virtual space. The first display condition is an example of a first condition regarding to a state of an avatar in the virtual space.

The display controller 333 causes the display 20 to display a character as the avatar B1 based on the avatar-related information T4 satisfying a second display condition without satisfying the first display condition, the character being determined based on a relationship between the user A1 and the user A2, the avatar-related information T4 being acquired by the acquirer 332. The second display condition is, for example, a condition in that the avatar B1 be placed in the area other than the school in the virtual space. The second display condition is an example of a second condition regarding the state of the avatar in the virtual space. The character that is determined based on the relationship between the user A1 and the user A2 is an example of a second character.

In a state in which the avatar-related information T4 satisfies the second display condition without satisfying the first display condition, the display controller 333 determines, based on the relationship between the user A1 and the user A2 being a relationship of friendship, as the second character the character B11a shown in FIG. 14. The character B11a is the real avatar of the user A1.

In the state in which the avatar-related information T4 satisfies the second display condition without satisfying the first display condition, the display controller 333 determines, based on the relationship between the user A1 and the user A2 not being a relationship of friendship, as the second character the character B12a shown in FIG. 14. The character B12a is the non-real avatar of the user A1.

The display controller 333 causes the display 10 to display the character B22a as the avatar B2 based on the avatar-related information T4 satisfying a third display condition, the character B22a being shown in FIG. 14, the avatar-related information T4 being acquired by the acquirer 332. The character B22a is the non-real avatar of the user A2. The third display condition is, for example, a condition in that the avatar B2 be placed in the costume party venue in the virtual space. The third display condition is another example of the first condition.

The display controller 333 causes the display 10 to display a character as the avatar B2 based on the avatar-related information T4 satisfying a fourth display condition without satisfying the third display condition, the character being determined based on the relationship between the user A1 and the user A2, the avatar-related information T4 being acquired by the acquirer 332. The fourth display condition is, for example, a condition in that the avatar B2 be placed in the area other than the costume party venue in the virtual space. The fourth display condition is another example of the second condition. The character that is determined based on the relationship between the user A1 and the user A2 is an example of the second character.

In a state in which the avatar-related information T4 satisfies the fourth display condition without satisfying the third display condition, the display controller 333 determines, based on the relationship between the user A1 and the user A2 being a relationship of friendship, as the second character the character B21a shown in FIG. 14. The character B21a is the real avatar of the user A2.

In the state in which the avatar-related information T4 satisfies the fourth display condition without satisfying the third display condition, the display controller 333 determines, based on the relationship between the user A1 and the user A2 not being a relationship of friendship as the second character the character B22a shown in FIG. 14. The character B22a is the non-real avatar of the user A2.

A5: Description of Operation

The avatar managing apparatus 30 operates based on the display control information T3 as shown in FIG. 15. To facilitate explanation, it is assumed that the storage device 32 of the avatar managing apparatus 30 stores the user information T1 shown in FIG. 13, the avatar information T2 shown in FIG. 14, the display control information T3 shown in FIG. 15, and the avatar-related information T4 shown in FIG. 16. The user information T1 includes the user information T11 for the user A1 and the user information T12 for the user A2. The avatar information T2 includes the avatar information T21 for the user A1 and the avatar information T22 for the user A2. The display control information T3 includes the display control information T31 for the user A1 and the display control information T32 for the user A2. The avatar-related information T4 includes the avatar-related information T41 for the user A1 and the avatar-related information T42 for the user A2. It is assumed that the display controller 333 has map information indicative of a map of the virtual space. It is assumed that the avatar B1 and the avatar B2 are placed in the virtual space.

The avatar managing apparatus 30 controls displaying of the avatar B1 on the display 20 based on the display control information T31 for the user A1.

Figures 17, 18, 19:
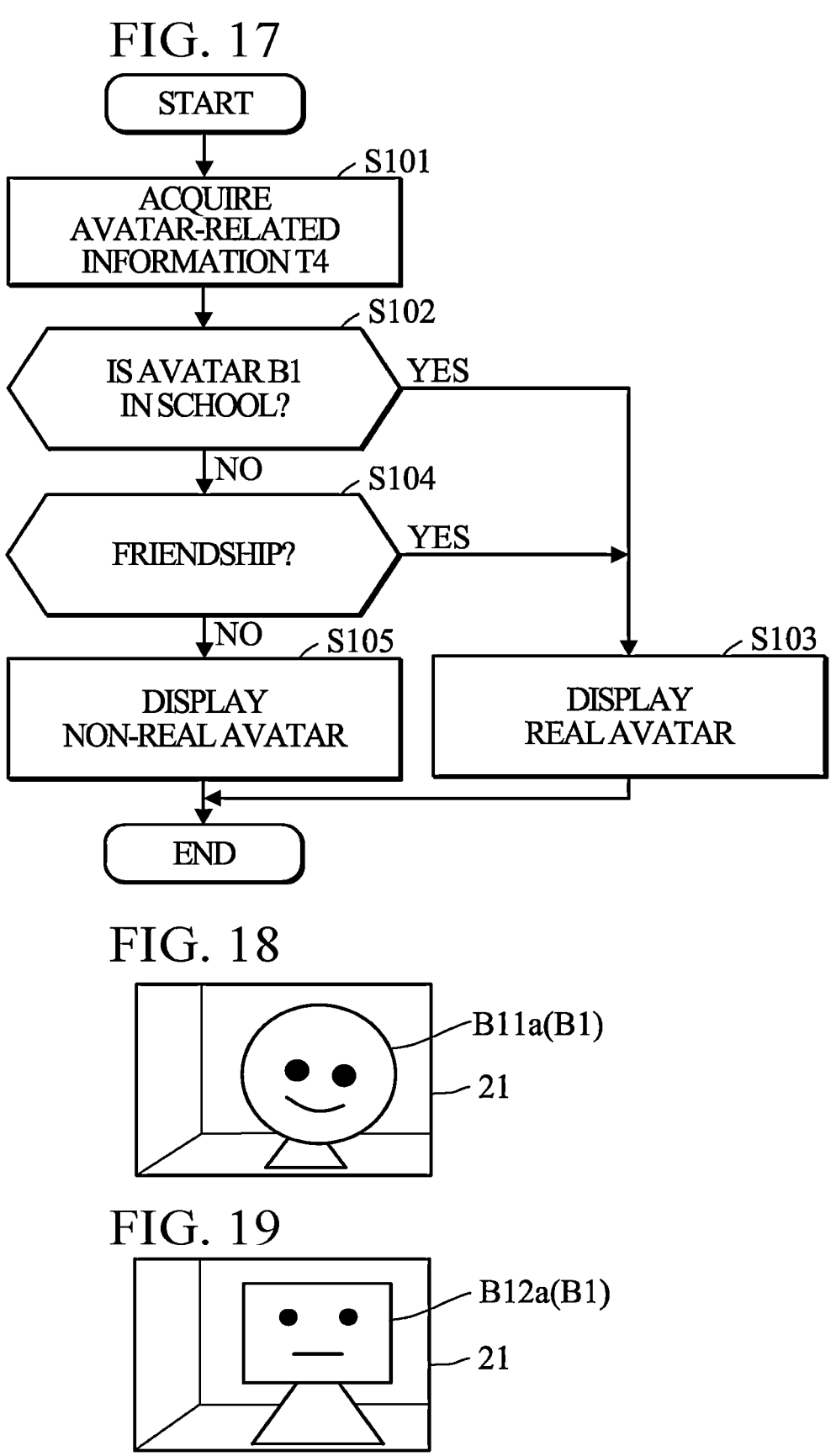

FIG. 17 is a diagram explaining an example of an operation of the avatar managing apparatus 30 based on the display control information T31 for the user A1.

At step S101, the acquirer 332 acquires the avatar-related information T4 by reading the avatar-related information T4 from the storage device 32.

Subsequently, at step S102, the display controller 333 determines whether the avatar B1 is placed in the school in the virtual space.

At step S102, the display controller 333 first determines avatar location information indicative of a location of the avatar B1 in the virtual space based on the avatar-related information T4 acquired by the acquirer 332. The avatar location information indicative of the location of the avatar B1 in the virtual space is referred to as "first avatar location information." Subsequently, the display controller 333 uses the map information to determine whether the location of the avatar B1 indicated by the first avatar location information is included in the area in the virtual space in which the school is placed.

When the location of the avatar B1 indicated by the first avatar location information is included in the area in the virtual space in which the school is placed, the display controller 333 determines that the avatar B1 is placed in the school in the virtual space. A fact that the avatar B1 is placed in the school in the virtual space means that the avatar-related information T4 satisfies the first display condition.

When the location of the avatar B1 indicated by the first avatar location information is not included in the area in the virtual space in which the school is placed, the display controller 333 determines that the avatar B1 is not placed in the school in the virtual space. A fact that the avatar B1 is not placed in the school in the virtual space means that the avatar-related information T4 satisfies the second display condition without satisfying the first display condition. In the following description, to facilitate explanation, a state in which the avatar B1 is not placed in the school in the virtual space is assumed to be a state in which the avatar B1 is placed in the store in the virtual space. The state in which the avatar B1 is not placed in the school in the virtual space is not limited to the state in which the avatar B1 is placed in the store in the virtual space, and may be a state in which the avatar B1 is placed in the open space in the virtual space, for example.

When the display controller 333 determines at step S102 that the avatar B1 is placed in the school in the virtual space, the display controller 333 causes the display 20 to display the character B11a, which is the real avatar of the user A1, at step S103.

At step S103 following step S102, the display controller 333 first refers to the user information T11 for the user A1 to determine the character B11 that is the real avatar ID of the user A1. Subsequently, the display controller 333 refers to the avatar information T21 for the user A1 to determine, as the second character, the character B11a associated with the character B11. Subsequently, the display controller 333 generates, based on the map information and the character B11a, first image information indicative of the character B11a that is placed in the school in the virtual space. Subsequently, the display controller 333 transmits the first image information from the communication device 31 to the display 20. When the display 20 receives the first image information, the display 20 displays the character B11a that is placed in the school in the virtual space on the display unit 21 based on the first image information, as shown in FIG. 1.

When the display controller 333 determines at step S102 that the avatar B1 is not placed in the school in the virtual space, the display controller 333 determines at step S104 whether the relationship between the user A1 and the user A2 is a relationship of friendship.

At step S104, the display controller 333 refers to the user information T11 for the user A1 to determine whether the relationship between the user A1 and the user A2 is a relationship of friendship. When the user A2a corresponding to the user A2 is indicated in a field of a friend in the user information T11 for the user A1, the display controller 333 determines that the relationship between the user A1 and the user A2 is a relationship of friendship. When the user A2a corresponding to the user A2 is not indicated in the field of a friend in the user information T11 for the user A1, the display controller 333 determines that the relationship between the user A1 and the user A2 is not a relationship of friendship.

When the display controller 333 determines at step S104 that the relationship between the user A1 and the user A2 is a relationship of friendship, the display controller 333 causes the display 20 to display the character B11a, which is the real avatar of the user A1, at step S103.

At step S103 following step S104, the display controller 333 first refers to the user information T11 for the user A1 to determine the character B11 that is the real avatar ID of the user A1. Subsequently, the display controller 333 refers to the avatar information T21 for the user A1 to determine, as the second character, the character B11a associated with the character B11. Subsequently, the display controller 333 generates, based on the map information and the character B11a, second image information indicative of the character B11a that is placed in the store in the virtual space. Subsequently, the display controller 333 transmits the second image information from the communication device 31 to the display 20. When the display 20 receives the second image information, the display 20 displays the character B11a that is placed in the store in the virtual space on the display unit 21 based on the second image information, as shown in FIG. 18.

When the display controller 333 determines at step S104 that the relationship between the user A1 and the user A2 is not a relationship of friendship, the display controller 333 causes the display 20 to display the character B12a, which is the non-real avatar of the user A1, at step S105.

At step S105, the display controller 333 first refers to the user information T11 for the user A1 to determine the character B12 that is the non-real avatar ID of the user A1. Subsequently, the display controller 333 refers to the avatar information T2 for the user A1 to determine, as the second character, the character B12a associated with the character B12. Subsequently, the display controller 333 generates, based on the map information and the character B12a, third image information indicative of the character B12a that is placed in the store in the virtual space. Subsequently, the display controller 333 transmits the third image information from the communication device 31 to the display 20. When the display 20 receives the third image information, the display 20 displays the character B12a that is placed in the store in the virtual space on the display unit 21 based on the third image information, as shown in FIG. 19.

The avatar managing apparatus 30 controls displaying of the avatar B2 on the display 10 based on the display control information T32 for the user A2.

Figures 20, 21, 22:
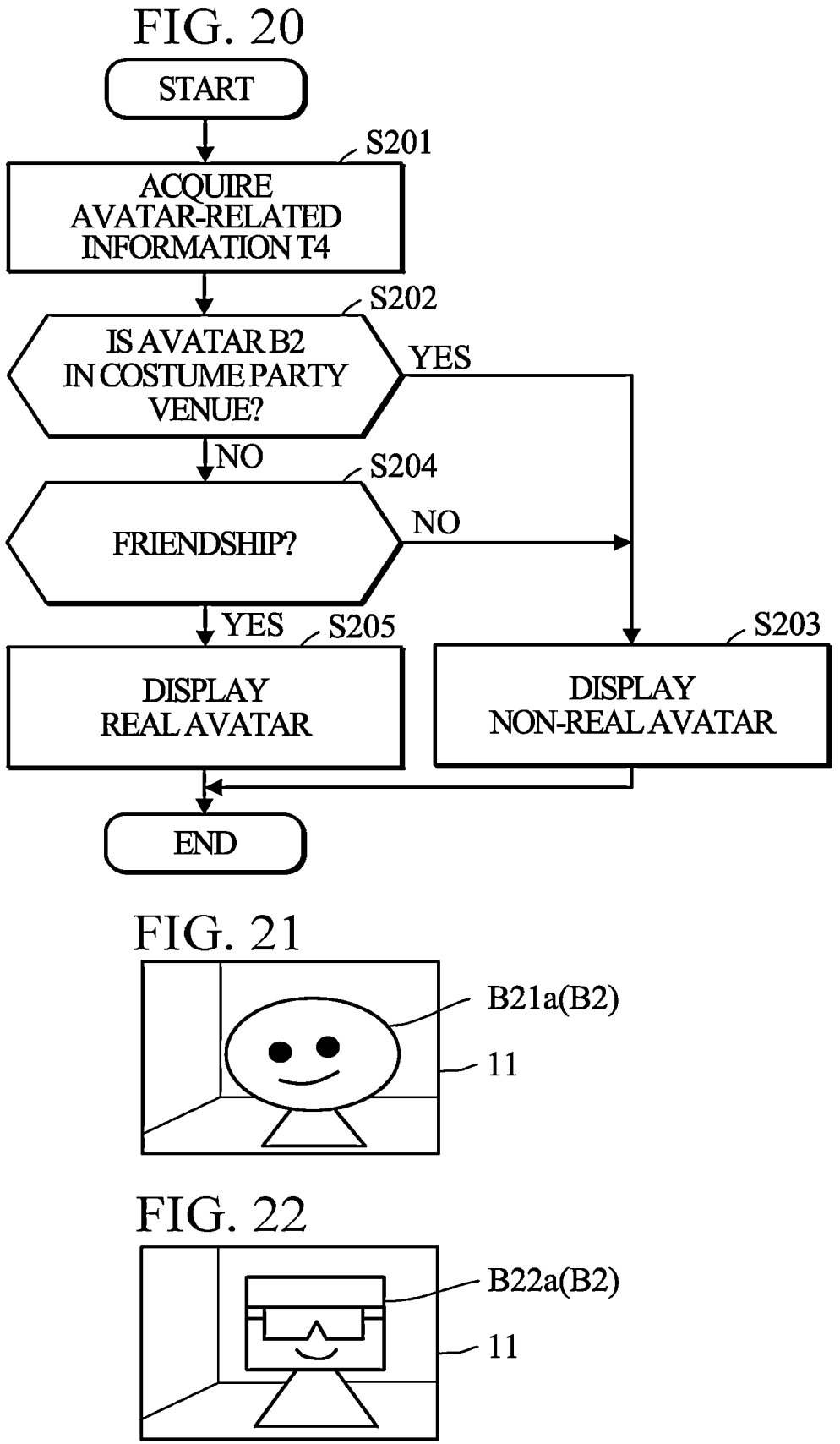

FIG. 20 is a diagram explaining an example of an operation of the avatar managing apparatus 30 based on the display control information T32 for the user A2.

At step S201, the acquirer 332 acquires the avatar-related information T4 by reading the avatar-related information T4 from the storage device 32.

Subsequently, at step S202, the display controller 333 determines whether the avatar B2 is placed in the costume party venue in the virtual space.

At step S202, the display controller 333 first determines avatar location information indicative of a location of the avatar B2 in the virtual space based on the avatar-related information T4 acquired by the acquirer 332. The avatar location information indicative of the location of the avatar B2 in the virtual space is referred to as "second avatar location information." Subsequently, the display controller 333 uses the map information to determine whether the location of the avatar B2 indicated by the second avatar location information is included in the area in the virtual space in which the costume party venue is placed.

When the location of the avatar B2 indicated by the second avatar location information is included in the area in the virtual space in which the costume party venue is placed, the display controller 333 determines that the avatar B2 is placed in the costume party venue in the virtual space. A fact that the avatar B2 is placed in the costume party venue in the virtual space means that the avatar-related information T4 satisfies the third display condition.

When the location of the avatar B2 indicated by the second avatar location information is not included in the area in the virtual space in which the costume party venue is placed, the display controller 333 determines that the avatar B2 is not placed in the costume party venue in the virtual space. A fact that the avatar B2 is not placed in the costume party venue in the virtual space means that the avatar-related information T4 satisfies the fourth display condition without satisfying the third display condition. In the following description, to facilitate explanation, a state in which the avatar B2 is not placed in the costume party venue in the virtual space is assumed to be a state in which the avatar B2 is placed in the store in the virtual space. The state in which the avatar B2 is not placed in the costume party venue in the virtual space is not limited to the state in which the avatar B2 is placed in the store in the virtual space, and may be a state in which the avatar B2 is placed in the open space in the virtual space, for example.

When the display controller 333 determines at step S202 that the avatar B2 is placed in the costume party venue in the virtual space, the display controller 333 causes the display 10 to display the character B22a, which is the non-real avatar of the user A2, at step S203.

At step S203 following step S202, the display controller 333 first refers to the user information T12 for the user A2 to determine the character B22 that is the non-real avatar ID of the user A2. Subsequently, the display controller 333 refers to the avatar information T22 for the user A2 to determine, as the second character, the character B22a associated with the character B22. Subsequently, the display controller 333 generates, based on the map information and the character B22a, fourth image information indicative of the character B22a that is placed in the costume party venue in the virtual space. Subsequently, the display controller 333 transmits the fourth image information from the communication device 31 to the display 10. When the operation controller 152 of the display 10 receives the fourth image information via the communication device 13, the operation controller 152 displays, based on the fourth image information, the character B22a that is placed in the costume party venue in the virtual space on the display unit 11.

When the display controller 333 determines at step S202 that the avatar B2 is not placed in the costume party venue in the virtual space, the display controller 333 determines at step S204 whether the relationship between the user A2 and the user A1 is a relationship of friendship.

At step S204, the display controller 333 refers to the user information T12 for the user A2 to determine whether the relationship between the user A2 and the user A1 is a relationship of friendship. When the user A1a corresponding to the user A1 is indicated in a field of a friend in the user information T12 for the user A2, the display controller 333 determines that the relationship between the user A2 and the user A1 is a relationship of friendship. When the user A1a corresponding to the user A1 is not indicated in the field of a friend in the user information T12 for the user A2, the display controller 333 determines that the relationship between the user A2 and the user A1 is not a relationship of friendship.

When the display controller 333 determines at step S204 that the relationship between the user A2 and the user A1 is a relationship of friendship, the display controller 333 causes the display 10 to display the character B21a, which is the real avatar of the user A2, at step S205.

At step S205, the display controller 333 first refers to the user information T12 for the user A2 to determine the character B21 that is the real avatar ID of the user A2. Subsequently, the display controller 333 refers to the avatar information T22 for the user A2 to determine, as the second character, the character B21a associated with the character B21. Subsequently, the display controller 333 generates, based on the map information and the character B21a, fifth image information indicative of the character B21a that is placed in the store in the virtual space. Subsequently, the display controller 333 transmits the fifth image information from the communication device 31 to the display 10. When the operation controller 152 of the display 10 receives the fifth image information via the communication device 13, the operation controller 152 displays the character B21a that is placed in the store in the virtual space on the display unit 11 based on the fifth image information, as shown in FIG. 21.

When the display controller 333 determines at step S204 that the relationship between the user A2 and the user A1 is not a relationship of friendship, the display controller 333 causes the display 10 to display the character B22a, which is the non-real avatar of the user A2, at step S203.

At step S203 following step S204, the display controller 333 first refers to the user information T12 for the user A2 to determine the character B22 that is the non-real avatar ID of the user A2. Subsequently, the display controller 333 refers to the avatar information T22 for the user A2 to determine, as the second character, the character B22a associated with the character B22. Subsequently, the display controller 333 generates, based on the map information and the character B22a, sixth image information indicative of the character B22a that is placed in the store in the virtual space. Subsequently, the display controller 333 transmits the sixth image information from the communication device 31 to the display 10. When the operation controller 152 of the display 10 receives the sixth image information via the communication device 13, the operation controller 152 displays the character B22a that is placed in the store in the virtual space on the display unit 11 based on the sixth image information, as shown in FIG. 22.

A6: Summary of First Embodiment

The acquirer 332 acquires the avatar-related information T4. The display controller 333 causes the display 20 to display the character B11a as the avatar B1 based on the avatar-related information T4 satisfying the first display condition. The display controller 333 causes the display 20 to display the character (the second character), which is determined based on the relationship between the user A1 and the user A2, as the avatar B1 based on the avatar-related information T4 satisfying the second display condition without satisfying the first display condition. Thus, it is possible to meet a need to use a specific character (for example, the character B11a) as an avatar regardless of a relationship between users when a predetermined condition is satisfied.

The display controller 333 determines the character B11a as the second character based on the relationship between the user A1 and the user A2 being a relationship of friendship in the state in which the avatar-related information T4 satisfies the second display condition without satisfying the first display condition. The display controller 333 determines the character B12a as the second character based on the relationship between the user A1 and the user A2 not being a relationship of friendship in the state in which the avatar-related information T4 satisfies the second display condition without satisfying the first display condition. Thus, in the state in which the avatar-related information T4 satisfies the second display condition without satisfying the first display condition, it is possible to change an avatar, which is to be displayed, depending on whether the relationship between the user A1 and the user A2 is a relationship of friendship.

The character B11a is a real avatar, whereas the character B12a is a non-real avatar. Thus, in the state the avatar-related information T4 satisfies the second display condition without satisfying the first display condition, a real avatar is displayed to a user who has a relationship of friendship, whereas a non-real avatar is displayed to a user who does not have a relationship of friendship. As a result, it is possible to protect a real avatar that has a possibility of having personal information compared to a configuration in which a real avatar is displayed to the user who does not have a relationship of friendship in the state in which the avatar-related information T4 satisfies the second display condition without satisfying the first display condition.

The acquirer 332 acquires the avatar-related information T4. The display controller 333 causes the display 10 to display the character B22a as the avatar B2 based on the avatar-related information T4 satisfying the third display condition. The display controller 333 causes the display 10 to display the character (the second character), which is determined based on the relationship between the user A2 and the user A1, as the avatar B2 based on the avatar-related information T4 satisfying the fourth display condition without satisfying the third display condition. Thus, it is possible to meet a need to use a specific character (for example, the character B22a) as an avatar regardless of a relationship between users when a predetermined condition is satisfied.

The display controller 333 determines the character B21a to be the second character based on the relationship between the user A2 and the user A1 being a relationship of friendship in the state in which the avatar-related information T4 satisfies the fourth display condition without satisfying the third display condition. The display controller 333 determines the character 212a as the second character based on the relationship between the user A2 and the user A1 not being a relationship of friendship in the state in which the avatar-related information T4 satisfies the fourth display condition without satisfying the third display condition. Thus, in the state in which the avatar-related information T4 satisfies the fourth display condition without satisfying the third display condition, it is possible to change an avatar, which is to be displayed, depending on whether the relationship between the user A2 and the user A1 is a relationship of friendship.

The character B21a is a real avatar, whereas the character B22a is a non-real avatar. Thus, in the state the avatar-related information T4 satisfies the fourth display condition without satisfying the third display condition, a real avatar is displayed to the user who has a relationship of friendship, whereas a non-real avatar is displayed to the user who does not have a relationship of friendship. As a result, it is possible to protect a real avatar that has possibility of having personal information compared to a configuration in which a real avatar is displayed to the user who does not have a relationship of friendship in the state the avatar-related information T4 satisfies the fourth display condition without satisfying the third display condition.

B: Modifications

The following are examples of modifications of the embodiment described above. Two or more modifications freely selected from the following modifications may be combined as long as no conflict arises from such combination.

B1: First Modification

In the first embodiment, the display controller 333 may cause the display 20 to perform a change from displaying of the character B11a to displaying of the character B12a by repeatedly executing the operation shown in FIG. 17 in a state in which the location of the avatar B1 is changed.

For example, when the avatar B1 leaves the school in the virtual space, the display controller 333 causes a display used by a user who does not have a relationship of friendship with the user A1 to perform the change from the displaying of the character B11a to the displaying of the character B12a.

The change from the displaying of the character B11a to the displaying of the character B12a may be a change from displaying of a first transition character to the displaying of the character B12a after a change from the displaying of the character B11a to the displaying of the first transition character.

The first transition character is an example of a fourth character. The first transition character is a character that differs from both the character B11a and the character B12a. The first transition character is, for example, a character having a shape of a cloud. The first transition character is not limited to the character having a shape of a cloud, and it may be a transparent character, for example.

The change from the displaying of the character B11a to the displaying of the first transition character is, for example, a change directly from the displaying of the character B11a to the displaying of the first transition character. The change from the displaying of the character B11a to the displaying of the first transition character may include displaying of at least one first intermediate character performed between the displaying of the character B11a and the displaying of the first transition character.

The at least one first intermediate character is a character that differs from both the character B11a and the first transition character. The at least one first intermediate character is, for example, a character obtained by changing the character B11a to being translucent. The at least one first intermediate character is not limited to the character obtained by changing the character B11a to being translucent, and may be a character obtained by changing the entire character B11a to being black or to being blue, for example.

The change from the displaying of the first transition character to the displaying of the character B12a is, for example, a change directly from the displaying of the first transition character to the displaying of the character B12a. The change from the displaying of the first transition character to the displaying of the character B12a may include displaying of at least one second intermediate character performed between the displaying of the first transition character and the displaying of the character B12a.

The at least one second intermediate character is a character that differs from both the first transition character and the character B12a. The at least one second intermediate character is, for example, a character obtained by changing the character B12a to being translucent. The at least one second intermediate character is not limited to the character obtained by changing the character B12a to being translucent, and may be a character obtained by changing the entire character B12a to being black or to being green, for example.

According to the first modification, compared to a configuration in which the displaying of the character B11a is directly changed to the displaying of the character B12a, it is possible to reduce the probability that a relationship between the character B11a and the character B12a is known to the user not having a relationship of friendship with the user A1. When the at least one first intermediate character is used, it is possible to reduce the probability that the relationship between the character B11a and the character B12*a* is known to the user not having a relationship of friendship with the user A1 compared to a configuration in which the at least one first intermediate character is not used. When the at least one second intermediate character is used, it is possible to reduce the probability that the relationship between the character B11*a* and the character B12*a* is known to the user not having a relationship of friendship with the user A1 compared to a configuration in which the at least one second intermediate character is not used.

B2: Second Modification

In the first embodiment and in the first modification, the display controller 333 may cause the display 10 to perform a change from displaying of the character B22*a* to displaying of the character B21*a* by repeatedly executing the operation shown in FIG. 20 in a state in which the location of the avatar B2 is changed.

For example, when the avatar B2 leaves the costume party venue in the virtual space, the display controller 333 causes a display used by a user having a relationship of friendship with the user A2 to perform the change from the displaying of the character B22*a* to the displaying of the character B12*a*.

The change from the displaying of the character B22*a* to the displaying of the character B21*a* may be a change from displaying of a second transition character to the displaying of the character B21*a* after a change from the displaying of the character B11*a* to the displaying of the second transition character.

The second transition character is another example of the fourth character. The second transition character is a character that differs from both the character B22*a* and the character B21*a*. The second transition character is, for example, a character having a shape of a cloud. The second transition character is not limited to the character having a shape of a cloud, and it may be a transparent character, for example. The second transition character may be the same as, or be different from, the first transition character. When the second transition character is the same as the first transition character, it is possible to reduce avatars that should be managed by the avatar managing apparatus 30 compared to a configuration in which the second transition character is different from the first transition character. Thus, it is possible to substantially prevent an increase in load of the avatar managing apparatus 30. When the second transition character is different from the first transition character, it is possible to display a variety of characters compared to a configuration in which the second transition character is the same as the first transition character. Thus, it is possible to provide a user with the fun of engaging with various characters.

The change from the displaying of the character B22*a* to the displaying of the second transition character is, for example, a change directly from the displaying of the character B22*a* to the displaying of the second transition character. The change from the displaying of the character B22*a* to the displaying of the second transition character may include displaying of at least one third intermediate character performed between the 20 displaying of the character B22*a* and the displaying of the second transition character.

The at least one third intermediate character is a character that differs from both the character B22*a* and the second transition character. The at least one third intermediate character is, for example, a character obtained by changing the character B22*a* to being translucent. The at least one third intermediate character is not limited to the character obtained by changing the character B22*a* to being translucent, and may be a character obtained by changing the entire character B22*a* to being black or to being red, for example.

The change from the displaying of the second transition character to the displaying of the character B21*a* is, for example, a change directly from the displaying of the second transition character to the displaying of the character B21*a*. The change from the displaying of the second transition character to the displaying of the character B21*a* may include displaying of at least one fourth intermediate character performed between the displaying of the second transition character and the displaying of the character B21*a*.

The at least one fourth intermediate character is a character that differs from both the second transition character and the character B21*a*. The at least one fourth intermediate character is, for example, a character obtained by changing the character B21*a* to being translucent. The at least one fourth intermediate character is not limited to the character obtained by changing the character B21*a* to being translucent, and may be a character obtained by changing the entire character B21*a* to being black or to being green, for example.

According to the second modification, compared to a configuration in which the displaying of the character B22*a* is directly changed to the displaying of the character B21*a*, it is possible to reduce the probability that a relationship between the character B22*a* and the character B21*a* is known to a user having a relationship of friendship with the user A1. When the at least one third intermediate character is used, it is possible to reduce the probability that the relationship between the character B22*a* and the character B21*a* is known to the user having a relationship of friendship with the user A1 compared to a configuration in which the at least one third intermediate character is not used. When the at least one fourth intermediate character is used, it is possible to reduce the probability that the relationship between the character B22*a* and the character B21*a* is known to the user having a relationship of friendship with the user A1 compared to a configuration in which the at least one fourth intermediate character is not used.

B3: Third Modification

In the first embodiment and in the first and second modifications, the display controller 333 may cause the display 20 to perform a change from displaying of the character B12*a* to displaying of the character B11*a* by repeatedly executing the operation shown in FIG. 17 in a state in which the location of the avatar B1 is changed.

For example, when the avatar B1 enters the area in the virtual space in which the school is placed, the display controller 333 causes the display used by the user not having a relationship of friendship with the user A1 to perform the change from the displaying of the character B12*a* to the displaying of the character B11*a*.

The change from the displaying of the character B12*a* to the displaying of the character B11*a* may be a change from displaying of a third transition character to the displaying of the character B11*a* after a change from the displaying of the character B12*a* to the displaying of the third transition character.

The third transition character is an example of a fifth character. The third transition character is a character that differs from both the character B11*a* and the character B12*a*. The third transition character is, for example, a character having a shape of a cloud. The third transition character is not limited to the character having a shape of a cloud, and it may be a transparent character, for example. The third transition character may be different from both the first transition character and the second transition character, or alternatively, the third transition character may be the same as at least one of the first transition character and the second transition character. The at least one of the first transition character and the second transition character means, for example, "the first transition character," "the second transition character," or "the first transition character and the second transition character."

The change from the displaying of the character B12a to the displaying of the third transition character is, for example, a change directly from the displaying of the character B12a to the displaying of the third transition character. The change from the displaying of the character B12a to the displaying of the third transition character may include displaying of at least one fifth intermediate character performed between the displaying of the character B12a and the displaying of the third transition character.

The at least one fifth intermediate character is a character that differs from both the character B12a and the third transition character. The at least one fifth intermediate character is, for example, a character obtained by changing the character B12a to being translucent. The at least one fifth intermediate character is not limited to the character obtained by changing the character B12a to being translucent, and may be a character obtained by changing the entire character B12a to being black or to being blue, for example.

The change from the displaying of the third transition character to the displaying of the character B11a is a change directly from the displaying of the third transition character to the displaying of the character B11a. The change from the displaying of the third transition character to the displaying of the character B11a may include displaying of at least one sixth intermediate character performed between the displaying of the third transition character and the displaying of the character B11a.

The at least one sixth intermediate character is a character that differs from both the third transition character and the character B11a. The at least one sixth intermediate character is, for example, a character obtained by changing the character B11a to being translucent. The at least one sixth intermediate character is not limited to the character obtained by changing the character B11a to being translucent, and it may be a character obtained by changing the entire character B11a to being black or to being green, for example.

According to the third modification, compared to a configuration in which the displaying of the character B12a is directly changed to the displaying of the character B11a, it is possible to reduce the probability that the relationship between the character B11a and the character B12a is known to the user not having a relationship of friendship with the user A1. When the at least one fifth intermediate character is used, it is possible to reduce the probability that the relationship between the character B11a and the character B12a is known to the user not having a relationship of friendship with the user A1 compared to a configuration in which the at least one fifth intermediate character is not used. When the at least one sixth intermediate character is used, it is possible to reduce the probability that the relationship between the character B11a and the character B12a is known to the user not having a relationship of friendship with the user A1 compared to a configuration in which the at least one sixth intermediate character is not used.

B4: Fourth Modification

In the first embodiment and in the first to third modifications, the display controller 333 may cause the display 10 to perform a change from displaying of the character B21a to displaying of the character B22a by repeatedly executing the operation shown in FIG. 20 in a state in which the location of the avatar B2 is changed.

For example, when the avatar B2 enters the costume party venue in the virtual space, the display controller 333 causes the display used by the user having a relationship of friendship with the user A2 to perform the change from the displaying of the character B21a to the displaying of the character B22a.

The change from the displaying of the character B21a to the displaying of the character B22a may be a change from displaying of a fourth transition character to the displaying of the character B22a after a change from the displaying of the character B21a to the displaying of the fourth transition character.

The fourth transition character is another example of the fifth character. The fourth transition character is a character that differs from both the character B21a and the character B22a. The fourth transition character is, for example, a character having a shape of a cloud. The fourth transition character is not limited to the character having a shape of a cloud, and may be a transparent character, for example. The fourth transition character may be a character that differs from each of the first transition character, the second transition character, and the third transition character, or alternatively, the fourth transition character may be the same as at least one of the first transition character, the second transition character, and the third transition character. The at least one of the first transition character, the second transition character, and the third transition character means, for example, "the first transition character," "the second transition character," "the third transition character," "the first transition character and the second transition character," "the first transition character and the third transition character," "the second transition character and the third transition character," or, "the first transition character, the second transition character, and the third transition character."

The change from the displaying of the character B21a to the displaying of the fourth transition character is, for example, a change directly from the displaying of the character B21a to the displaying of the fourth transition character. The change from the displaying of the character B21a to the displaying of the fourth transition character may include displaying of at least one seventh intermediate character performed between the displaying of the character B21a and the displaying of the fourth transition character.

The at least one seventh intermediate character is a character that differs from both the character B21a and the fourth transition character. The at least one seventh intermediate character is, for example, a character obtained by changing the character B21a to being translucent. The at least one seventh intermediate character is not limited to the character obtained by changing the character B21a to being translucent, and may be a character obtained by changing the entire character B21a to being black or to being blue, for example.

The change from the displaying of the fourth transition character to the displaying of the character B22a is, for example, a change directly from the displaying of the fourth transition character to the displaying of the character B22a. The change from the displaying of the fourth transition character to the displaying of the character B22a may include displaying of at least one eighth intermediate character performed between the displaying of the fourth transition character and the displaying of the character B22a.

The at least one eighth intermediate character is a character that differs from both the fourth transition character and the character B22a. The at least one eighth intermediate character is, for example, a character obtained by changing the character B22a to being translucent. The at least one eighth intermediate character is not limited to the character obtained by changing the character B22a to being translucent, and may be a character obtained by changing the entire character B22a to being black or to being green, for example.

According to the fourth modification, compared to a configuration in which the displaying of the character B21a is directly changed to the displaying of the character B22a, it is possible to reduce the probability that the relationship between the character B21a and the character B22a is known to the user having a relationship of friendship with the user A1. When the at least one seventh intermediate character is used, it is possible to reduce the probability that the relationship between the character B21a and the character B22a is known to the user having a relationship of friendship with the user A1 compared to a configuration in which the at least one seventh intermediate character is not used. When the at least one eighth intermediate character is used, it is possible to reduce the probability that the relationship between the character B21a and the character B22a is known to the user having a relationship of friendship with the user A1 compared to a configuration in which the at least one eighth intermediate character is not used.

B5: Fifth Modification

In the first embodiment and in the first to fourth modifications, the first condition may be a condition in which the time in the virtual space is included in a first time slot, and the second condition may be a condition in which the time in the virtual space is included in a second time slot.

The fifth modification is applied, for example, in a state in which the store in the virtual space is reserved during a time slot from 10:00 AM to 11:00 AM in the virtual space for school classes. In this case, the time slot from 10:00 AM to 11:00 AM is an example of the first time slot, and a time slot other than the time slot from 10:00 AM to 11:00 AM is an example of the second time slot.

In the fifth modification, the register 331 generates time information indicative of the time in the virtual space in which the avatar B1 is placed. The time information is another example of the state information. The acquirer 332 acquires the time information from the register 331.

When the time indicated by the time information acquired by the acquirer 332 is included in the first time slot, the display controller 333 causes the display 20 to display the character B11a as the avatar B1.

When the relationship between the user A1 and the user A2 is a relationship of friendship in a state in which the time indicated by the time information is not included in the first time slot, the display controller 333 determines the character B11a to be the second character. Subsequently, the display controller 333 causes the display 20 to display the character B11a as the avatar B1.

When the relationship between the user A1 and the user A2 is not a relationship of friendship in the state in which the time indicated by the time information is not included in the first time slot, the display controller 333 determines the character B12a to be the second character. Subsequently, the display controller 333 causes the display 20 to display the character B12a as the avatar B1.

According to the fifth modification, it is possible to meet a need to use a specific character as an avatar regardless of a relationship between users when a first condition regarding time slot is satisfied.

B6: Sixth Modification

In the first embodiment and in the first to fifth modifications, the first condition may be a condition in which a weather condition in the virtual space is a first weather, and the second condition may be a condition in which the weather condition in the virtual space is a second weather.

The sixth modification is applied, for example, in a state in which the open space in the virtual space is reserved for school classes when the weather condition in the virtual space is fine weather. In this case, the fine weather in the virtual space is an example of the first weather, and weather conditions other than the fine weather in the virtual space are each an example of the second weather.

In the sixth modification, the register 331 generates weather information indicative of the weather condition in the virtual space in which the avatar B1 is placed. The weather information is another example of the state information. The acquirer 332 acquires the weather information from the register 331.

When the weather information acquired by the acquirer 332 indicates fine weather, the display controller 333 causes the display 20 to display the character B11a as the avatar B1.

When the relationship between the user A1 and the user A2 is a relationship of friendship in a state in which the weather information does not indicate fine weather, the display controller 333 determines the character B11a as the second character. Subsequently, the display controller 333 causes the display 20 to display the character B11a as the avatar B1.

When the relationship between the user A1 and the user A2 is not a relationship of friendship in the state in which the weather information does not indicate fine weather, the display controller 333 determines the character B12a as the second character. Subsequently, the display controller 333 causes the display 20 to display the character B12a as the avatar B1.

According to the sixth modification, it is possible to meet a need to use a specific character as an avatar regardless of a relationship between users when a first condition regarding weather is satisfied.

B7: Seventh Modification

In the first embodiment and in the first to sixth modifications, a character representative of a name of a user may be used instead of the real avatar.

Instead of the determination whether the relationship between the user A1 and the user A2 is a relationship of friendship, a determination may be used whether the relationship between the user A1 and the user A2 is a familial relationship.

The first display condition may be a condition in that the avatar B1 be placed in the school in the virtual space in a state in which the avatar B1 is in a field of view of the avatar B2. The field of view of the avatar B2 is set based on the location of the avatar B2.

The second display condition may be a condition in that the avatar B1 be placed in the area other than the school in the virtual space in a state in which the avatar B1 is in the field of view of the avatar B2.

The third display condition may be a condition in that the avatar B2 be placed in the costume party venue in the virtual space in a state in which the avatar B2 is in a field of view of the avatar B1. The field of view of the avatar B1 is set based on the location of the avatar B1.

The fourth display condition may be a condition in that the avatar B2 be placed in the area other than the costume party venue in the virtual space in a state in which the avatar B2 is in the field of view of the avatar B1.

The display 10 may include a camera. The camera captures a real world panorama in front of the user A1, for example. The display 10 may display an image of the real world captured by the camera on the display unit 11. The camera may capture either the left eye A1L of the user A1 or the right eye A1R of the user A1. In this case, the operation controller 152 of the display 10 may determine a direction of line of sight of the user A1 based on the image captured by the camera. The display 10 may display the direction of line of sight of the user A1 on the display unit 11.

C: Other Matters (1) Each function shown in FIG. 6 or FIG. 12 may be implemented by any combination of hardware and software. The method for implementing each function is not particularly limited. Each function may be implemented by one device that is physically or logically aggregated. Alternatively, each function may be realized by a system in which two or more physically or logically separate devices are directly or indirectly connected to one another (by use of cables and radio, or by cables alone, or by radio alone, for example). Each function may be implemented by combining software with the one device described above or with the two or more devices.

(2) The term "device" in this specification may be understood as another term such as a circuit, a device, a unit, etc.

(3) In each of the first embodiment and the first modification to the seventh modification, the storage device 14 and the storage device 32 may be constituted of at least one of an optical disk such as a Compact Disc-ROM (CD-ROM), a hard disk drive, a flexible disk, a magneto-optical disk (e.g., a compact disk, a digital multi-purpose disk, a Blu-ray (registered trademark) disc), a smart-card, a flash memory (e.g., a card, a stick, a key drive), a floppy (registered trademark) disk, a magnetic strip, etc. The program may be transmitted from a network via telecommunication lines.

(4) Each of the first embodiment and the first modification to the seventh modification may be applied to at least one of systems using Long Term Evolution (LTE), LTE-advanced (LTE-A), SUPER 3G, IMT-Advanced, 4th generation mobile communication system (4G), 5th generation mobile communication system (5G), 6th generation mobile communication system (6G), xth generation mobile communication system (xG) (where x is an integer or a decimal, for example), future radio access (FRA), new Radio (NR), New radio access (NX), Future generation radio access (FX), W-CDMA (registered trademark), GSM (registered trademark), CDMA2000, Ultra Mobile Broadband (UMB), IEEE 802.11 [Wi-Fi (registered trademark)], IEEE 802.16 [WiMAX (registered trademark)], IEEE 802.20, Ultra-wideband (UWB), Bluetooth (registered trademark), and other appropriate systems, and next-generation systems extended, modified, generated, or defined based on these system. Each of the first embodiment and the first modification to the seventh modification may be applied to a combination of systems (e.g., a combination of at least one of LTE and LTE-A with 5G, etc.).

(5) The order of processes, sequences, flowcharts, etc., that have been used to describe the first embodiment and the first modification to the seventh modification may be changed as long as they do not conflict. For example, although a variety of methods has been illustrated in this disclosure with a variety of elements of steps in exemplary orders, the specific orders presented herein are by no means limiting.

(6) In each of the first embodiment and the first modification to the seventh modification, the input and output of information, or the input or output of information, etc., may be stored in a specific location (e.g., memory) or may be managed by use of a management table. The information, etc., that is, the input and output, or the input or the output, may be overwritten, updated, or appended. The information, etc., that is output may be deleted. The information, etc., that is input may be transmitted to other devices.

(7) In each of the first embodiment and the first modification to the seventh modification, determination may be made based on values that can be represented by one bit (0 or 1), may be made based on Boolean values (true or false), or may be made based on comparing numerical values (for example, comparison with a predetermined value).

(8) The programs shown in each of the first embodiment and the first modification to the seventh modification should be widely interpreted as an instruction, an instruction set, a code, a code segment, a program code, a subprogram, a software module, an application, a software application, a software package, a routine, a subroutine, an object, an executable file, an execution thread, a procedure, a function, or the like, regardless of whether it is called software, firmware, middleware, microcode, hardware description language, or other names. Software, instructions, etc., may be transmitted and received via communication media. For example, when the software is transmitted from a website, a server, or other remote sources using at least one of wired technology (a coaxial cable, a fiber optic cable, a twisted pair cable, a digital subscriber line (DSL), etc.) or wireless technology (infrared, microwave, etc.), at least one of these wired and wireless technologies are included within the definition of the transmission medium.

(9) The information, etc., described in each of the first embodiment and the first modification to the seventh modification may be explained by use of various techniques. For example, data, instructions, etc., may be presented by freely selected combination of voltages, currents, electromagnetic waves, magnetic fields or magnetic particles, light fields or photons. It should be noted that the terms described in this specification and the terms necessary for understanding this specification may be replaced by terms having the same or similar meanings.

(10) In each of the first embodiment and the first modification to the seventh modification, the terms "system" and "network" are used interchangeably.

(11) In each of the first embodiment and the first modification to the seventh modification, at least one of the displays 10 and 20 may be a mobile station. A mobile station may be referred to, by one skilled in the art as a "subscriber station," a "mobile object," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client," or some other suitable terms.

(12) A mobile station may be referred to as a transmitting device, a receiving device, or a communication device, etc. The move station mobile station may a device provided on a movable object or the movable object itself. The movable object means an object that is able to be moved. Movement speed of the movable object is not limited. The movable object can be stopped. For example, the movable object is, but is not limited to, a vehicle, a transportation vehicle, an automobile, a motorcycle, a bicycle, a connected car, a shovel car, a bulldozer, a wheel loader, a dump truck, a forklift, a train, a bus, a cart, a handcart, a ship, a watercraft, an airplane, a rocket, a satellite, a drone (registered trademarks), a multirotor, a quadcopter, a balloon, and an object provided in any of these. The movable object may be a movable object that autonomously travels based on operation commands. The movable object may be a vehicle (e.g., a car, an airplane, etc.), or may be an unmanned movable object (e.g., a drone, an automated driving vehicle, etc.), or may be a robot (a manned robot or an unmanned robot). The movable object may be a device that does not necessarily move during communication. For example, the movable object may be an Internet of Things (IoT) device, such as a sensor.

(13) In each of the first embodiment and the first modification to the seventh modification, the term "determining" may mean a wide variety of operations. For example, the term "determining" may be used when practically "determining" that some act of judging, calculating, computing, processing, deriving, investigating, looking up, search, inquiry (for example, looking up, search, or inquiry a table, a database, or some other data structure), ascertaining, etc., has taken place. Furthermore, "determining" may be used when practically "determining" that some act of receiving (for example, receiving information), transmitting (for example, transmitting information), inputting, outputting, accessing (for example, accessing data in a memory) etc., has taken place. Furthermore, "determining" may be used when practically "determining" that some act of resolving, selecting, choosing, establishing, comparing, etc., has taken place. That is, "determining" may be used when practically determining to take some action. The term "determining" may be replaced with "assuming," "expecting," "considering," etc.

(14) In each of the first embodiment and the first modification to the seventh modification, the term "connected," or any modification thereof, may mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be replaced with "access." As used in this specification, two elements may be considered "connected" or "coupled" to each other by using one or more electrical wires, cables, and printed electrical connections, or by using one or more electrical wires, cables, or printed electrical connections. In addition, two elements may be considered "connected" or "coupled" to each other by using electromagnetic energy, etc., which is a non-limiting and non-inclusive example, having wavelengths in radio frequency regions, microwave regions, and optical (both visible and invisible) regions.

(15) In each of the first embodiment and the first modification to the seventh modification, the phrase "based on" as used in this specification does not mean "based only on," unless specified otherwise. In other words, the phrase "based on" means both "based only on" and "based at least on."

(16) Any reference to an element using the designations "first," and "second," etc., used herein does not generally limit the quantity or order of these elements. These designations may be used herein as a convenient way of distinguishing between two or more elements. Accordingly, references to the first and second elements do not mean that only two elements may be employed therein, or that the first element must precede the second element in any way.

(17) When terms such as "include" and modifications thereof are used in each of the first embodiment and the first modification to the seventh modification, these terms are intended to be inclusive, in a manner similar to the way the term "comprise" is used. Furthermore, the term "or" as used herein or in the claims is intended to be non-exclusive-OR.

(18) In the present disclosure, for example, when articles such as "a," "an," and "the" in English are added in translation, these articles include plurals unless otherwise clearly indicated by the context.

(19) It will be obvious to those skilled in the art that the present invention is not limited to the embodiments described in the specification. The present invention can be implemented with a variety of corrections and in a variety of modifications, without departing from the spirit and scope of the present invention defined as in the recitations of the claims. Consequently, the description in this specification is provided only for the purpose of explaining examples and should by no means be construed to limit the present invention in any way. In addition, a plurality of modes selected from the modes illustrated the specification may be used in combination.

D: Aspects Derivable from the Embodiment and the Modifications Described Above The following configurations are derivable from at least one of the embodiment and the modifications described above.

D1: First Aspect

The information processing apparatus according to a first aspect includes an acquirer and a display controller. The acquirer is configured to acquire state information regarding a state of an avatar in a virtual space, the avatar corresponding to a first user. The display controller is configured to:

cause a display used by a second user to display a first character as the avatar based on the state information satisfying a first condition regarding the state; and cause the display to display a second character as the avatar based on the state information satisfying a second condition regarding the state without satisfying the first condition, the second character being determined based on a relationship between the first user and the second user.

According to this aspect, it is possible to meet a need to use a specific character as an avatar regardless of a relationship between users when a predetermined condition is satisfied.

D2: Second Aspect

In an example (second aspect) of the first aspect, the display controller is configured to: determine the first character as the second character based on the relationship between the first user and the second user being a relationship of friendship; and determine a third character different from the first character as the second character based on the relationship between the first user and the second user not being a relationship of friendship. According to this aspect, in a state in which the state information satisfies the second condition without satisfying the first condition, it is possible to automatically switch the first character and the third character depending on whether the relationship between the first user and the second user is a relationship of friendship.

D3: Third Aspect

In an example (third aspect) of the second aspect, a degree of agreement between an appearance of the first character and an appearance of the first user is greater than a degree of agreement between an appearance of the third character and the appearance of the first user. According to this aspect, in the state in which the state information satisfies the second condition without satisfying the first condition, it is possible to show the first character, by which the first user is recognized with ease, to a user having a relationship of friendship, whereas it is possible to show the third character, by which the first user is recognized with difficulty, to a user not having a relationship of friendship.

D4: Fourth Aspect

In an example (fourth aspect) of the first aspect, the display controller is configured to: determine a third character different from the first character as the second character based on the relationship between the first user and the second user being a relationship of friendship; and determine the first character as the second character based on the relationship between the first user and the second user not being a relationship of friendship. According to this aspect, in the state in which the state information satisfies the second condition without satisfying the first condition, it is possible to automatically switch the first character and the third character depending on whether the relationship between the first user and the second user is a relationship of friendship.

D5: Fifth Aspect

In an example (fifth aspect) of the fourth aspect, a degree of agreement between an appearance of the third character and an appearance of the first user is greater than a degree of agreement between an appearance of the first character and the appearance of the first user. According to this aspect, in the state in which the state information satisfies the second condition without satisfying the first condition, it is possible to show the third character, by which the first user is recognized with ease, to a user having a relationship of friendship, whereas it is possible to show the first character, by which the first user is recognized with difficulty, to a user not having a relationship of friendship.

D6: Sixth Aspect

In an example (sixth aspect) of any one of the second to the fifth aspects, the display controller is configured to cause the display to perform a change from displaying of the first character to displaying of the third character, and the change from the displaying of the first character to the displaying of the third character includes a change from the displaying of the first character to displaying of a fourth character and a change from the 20 displaying of the fourth character to the displaying of the third character. According to this aspect, compared to a configuration in which the displaying of the first character is directly changed to the displaying of the third character, it is possible to reduce the probability that a relationship between the first character and the third character is known to a user not having a relationship of friendship with the first user.

D7: Seventh Aspect

In an example (seventh aspect) of any one of the second to the sixth aspects, the display controller is configured to cause the display to perform a change from displaying of the third character to displaying of the first character, and the change from the displaying of the third character to the displaying of the first character includes a change from the displaying of the third character to displaying of a fifth character and a change from the displaying of the fifth character to the displaying of the first character. According to this aspect, compared to a configuration in which the displaying of the third character is directly changed to the displaying of the first character, it is possible to reduce the probability that the relationship between the first character and the third character is known to the user not having a relationship of friendship with the first user.

D8: Eighth Aspect

In an example (eighth aspect) of any one of the first to the seventh aspects, the first condition is a condition in which the avatar is placed in a first area in the virtual space, and the second condition is a condition in which the avatar is placed in a second area in the virtual space. According to this aspect, it is possible to meet a need to use a specific character as an avatar regardless of a relationship between users when a first condition regarding location is satisfied.

D9: Ninth Aspect

In an example (ninth aspect) of any one of the first to the seventh aspects, the first condition is a condition in that time in the virtual space be included in a first time slot, and the second condition is a condition in which the time in the virtual space is included in a second time slot. According to this aspect, it is possible to meet a need to uses a specific character as an avatar regardless of a relationship between users when a first condition regarding time is satisfied.

D10: Tenth Aspect

In an example (tenth aspect) of any one of the first to the seventh aspects, the first condition is a condition in which a weather condition in the virtual space is a first weather, and the second condition is a condition in which the weather condition in the virtual space is a second weather. According to this aspect, it is possible to meet a need to uses a specific character as an avatar regardless of a relationship between users when a first condition regarding weather is satisfied.

DESCRIPTION OF REFERENCE SIGNS

1 . . . display control system, 10 . . . display, 11 . . . display unit, 11L . . . left-eye display unit, 11R . . . right-eye display unit, 12 . . . connector, 13 . . . communication device, 14 . . . storage device, 15 . . . processor, 16 . . . bus, 20 . . . display, 21 . . . display unit, 30 . . . avatar managing apparatus, 31 . . . communication device, 32 . . . storage device, 33 . . . processor, 34 . . . bus, 96 . . . controller, 96*a* . . . operating device, 151 . . . location determiner, 152 . . . operation controller, 331 . . . register, 332 . . . acquirer, 333 . . . display controller.

The invention claimed is:

1. An information processing apparatus comprising:

an acquirer configured to acquire state information regarding a state of an avatar in a virtual space, the avatar corresponding to a first user; and a display controller configured to:

cause a display used by a second user to display a first character as the avatar based on the state information satisfying a first condition regarding the state; and cause the display to display a second character as the avatar based on the state information satisfying a second condition regarding the state without satisfying the first condition, the second character being determined based on a relationship between the first user and the second user.

2. The information processing apparatus according to claim 1, wherein the display controller is configured to:

determine the first character as the second character based on the relationship between the first user and the second user being a relationship of friendship; and determine a third character different from the first character as the second character based on the relationship between the first user and the second user not being a relationship of friendship.

3. The information processing apparatus according to claim 2, wherein a degree of agreement between an appearance of the first character and an appearance of the first user is greater than a degree of agreement between an appearance of the third character and the appearance of the first user.

4. The information processing apparatus according to claim 3, wherein the display controller is configured to cause the display to perform a change from displaying of the first character to displaying of the third character, and wherein the change from the displaying the first character to the displaying of the third character includes:

a change from the displaying of the first character to displaying of a fourth character; and a change from the displaying of the fourth character to the displaying of the third character.

5. The information processing apparatus according to claim 2, wherein the display controller is configured to cause the display to perform a change from displaying of the first character to displaying of the third character, and wherein the change from the displaying the first character to the displaying of the third character includes:

a change from the displaying of the first character to displaying of a fourth character; and a change from the displaying of the fourth character to the displaying of the third character.

6. The information processing apparatus according to claim 2, wherein the display controller is configured to cause the display to perform a change from displaying of the third character to displaying of the first character, and wherein the change from the displaying of the third character to the displaying of the first character includes:

a change from the displaying of the third character to displaying of a fifth character; and a change from the displaying of the fifth character to the displaying of the first character.

7. The information processing apparatus according to claim 1, wherein the display controller is configured to:

determine a third character different from the first character as the second character based on the relationship between the first user and the second user being a relationship of friendship; and determine the first character as the second character based on the relationship between the first user and the second user not being a relationship of friendship.

8. The information processing apparatus according to claim 7, wherein a degree of agreement between an appearance of the third character and an appearance of the first user is greater than a degree of agreement between an appearance of the first character and the appearance of the first user.

9. The information processing apparatus according to claim 8, wherein the display controller is configured to cause the display to perform a change from displaying of the first character to displaying of the third character, and wherein the change from the displaying the first character to the displaying of the third character includes:

a change from the displaying of the first character to displaying of a fourth character; and a change from the displaying of the fourth character to the displaying of the third character.

10. The information processing apparatus according to claim 7, wherein the display controller is configured to cause the display to perform a change from displaying of the first character to displaying of the third character, and wherein the change from the displaying the first character to the displaying of the third character includes:

a change from the displaying of the first character to displaying of a fourth character; and a change from the displaying of the fourth character to the displaying of the third character.

11. The information processing apparatus according to claim 1, wherein the first condition is a condition in which the avatar is placed in a first area in the virtual space, and wherein the second condition is a condition in which the avatar is placed in a second area in the virtual space.

12. The information processing apparatus according to claim 1, wherein the first condition is a condition in which time in the virtual space is included in a first time slot, and wherein the second condition is a condition in which the time in the virtual space is included in a second time slot.

13. The information processing apparatus according to claim 1, wherein the first condition is a condition in which a weather condition in the virtual space is a first weather, and wherein the second condition is a condition in which the weather condition in the virtual space is a second weather.

\* \* \* \* \*